(12) United States Patent
Madineni et al.

(10) Patent No.: US 6,952,830 B2
(45) Date of Patent: Oct. 4, 2005

(54) SYSTEM AND METHOD TO UNIFORMLY ACCESS DEVICES

(75) Inventors: Kedar Madineni, Goleta, CA (US); Koral Ilgun, Santa Barbara, CA (US)

(73) Assignee: Occam Networks, Inc., Santa Barbara, CA (US)

(*) Notice: Subject to any disclaimer, the term of this patent is extended or adjusted under 35 U.S.C. 154(b) by 681 days.

(21) Appl. No.: 09/931,792

(22) Filed: Aug. 16, 2001

(65) Prior Publication Data

US 2003/0037180 A1 Feb. 20, 2003

(51) Int. Cl.$^7$ ............................................. G06F 9/44
(52) U.S. Cl. ......................... 719/321; 719/327; 710/8
(58) Field of Search ................................ 719/321, 327, 719/325; 710/1–19, 36–45; 709/213, 321

(56) References Cited

U.S. PATENT DOCUMENTS

| | | | |
|---|---|---|---|
| 5,745,762 A | | 4/1998 | Celi, Jr. et al. |
| 5,809,303 A | * | 9/1998 | Senator .................... 719/325 |
| 6,026,454 A | | 2/2000 | Hauck et al. |
| 6,167,538 A | | 12/2000 | Neufeld et al. |
| 6,233,624 B1 | | 5/2001 | Hyder et al. |
| 6,553,408 B1 | * | 4/2003 | Merrell et al. .............. 709/213 |
| 6,594,709 B1 | * | 7/2003 | Agasaveeran et al. ...... 719/321 |
| 6,714,992 B1 | * | 3/2004 | Kanojia et al. ............. 719/321 |
| 2003/0014561 A1 | * | 1/2003 | Cooper ....................... 709/321 |

FOREIGN PATENT DOCUMENTS

| | | |
|---|---|---|
| EP | 0 499 394 A1 | 8/1992 |
| EP | 000769745 A1 * | 4/1997 ........... G06F/11/34 |

OTHER PUBLICATIONS

International Search Report, PCT/US02/25904, mailed Dec. 2, 2003.

* cited by examiner

Primary Examiner—St. John Courtenay, III
(74) Attorney, Agent, or Firm—Blakely Sokoloff Taylor & Zafman LLP

(57) ABSTRACT

System and method to uniformly access devices. The method may include receiving at least one high-level request regarding at least one designated device of a plurality of devices from an application program, translating the high-level request to one or more low-level requests, and communicating the low-level request(s) to a device driver associated with one or more devices. The method may further include receiving a low-level message from a device, translating the low-level message to a high-level message, and forwarding the high-level message to the application program that sent the high-level request. The system may include a processor and a memory coupled to a bus, an application program, and a multiplexor to forward requests from the application program to a plurality of device drivers for corresponding devices, and to forward information received from the device drivers regarding the devices to the application program.

22 Claims, 6 Drawing Sheets

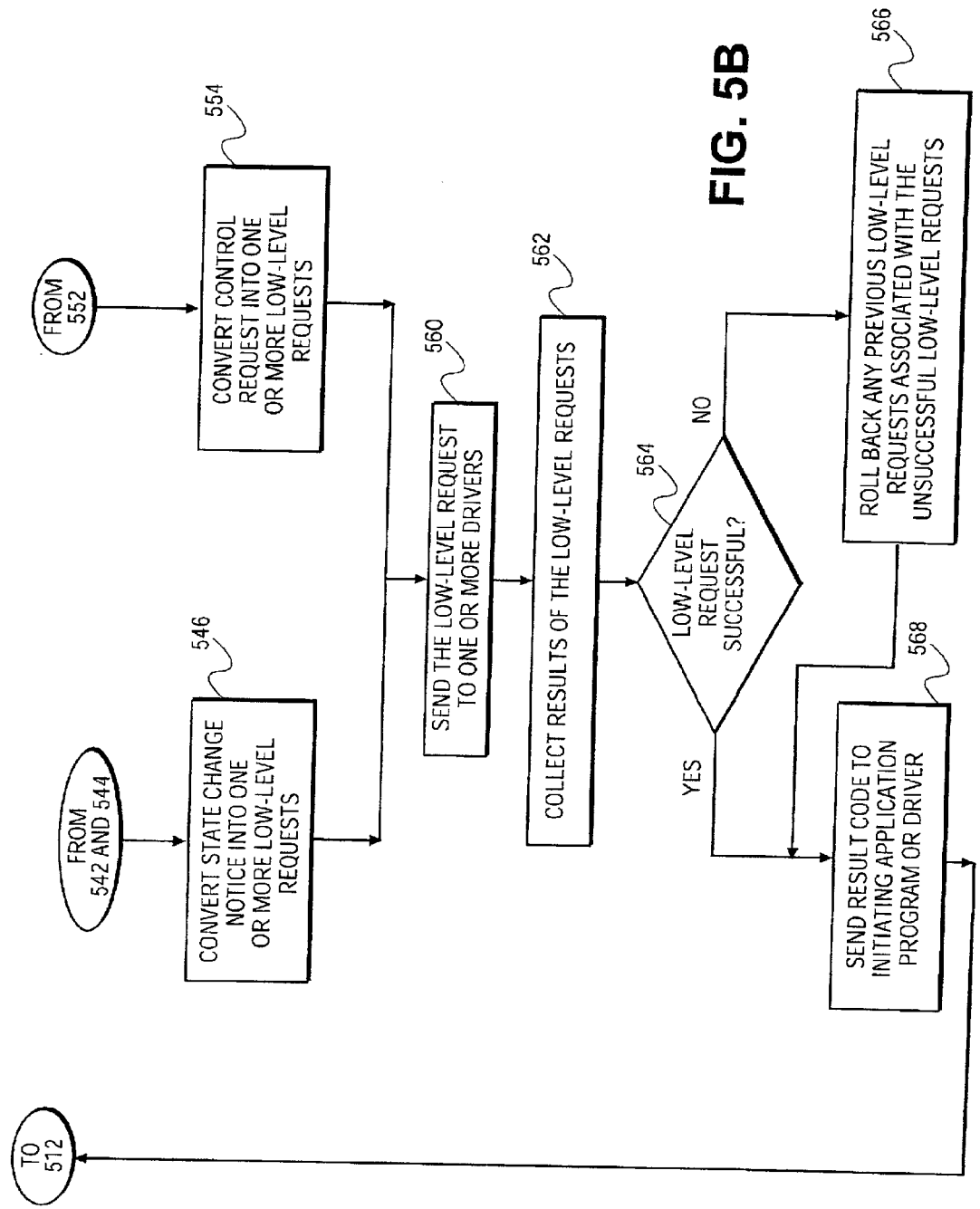

SYSTEM AND METHOD TO UNIFORMLY ACCESS DEVICES

FIELD OF THE INVENTION

The invention relates generally to computers and devices coupled with a computer, and, more specifically to providing a system and method for application programs to access devices in a uniform manner and for devices to access one another in a uniform manner.

BACKGROUND OF THE INVENTION

Computers are machines that include various devices, whether they be included internally in a computer case, attached in a card cage, or attached externally. In general, application programs may access devices by communicating with device drivers in an operating system. Each kind of device of a plurality of a devices which may be coupled to a computer require a separate device driver. For an application program to communicate with each of the plurality of devices, the application program must include specialized software that allows the application to communicate with each of the plurality of kinds of devices and maintain information concerning the communications with each of the kinds of devices.

FIG. 1 (Prior Art) illustrates a generalized conceptual architecture of prior art communication between application programs and devices in a computer system. Application programs 110 in user space 102 may communicate with various drivers 150 in an operating system kernel that exists in kernel space 104 to access a plurality of devices 160 at hardware level 106. To configure the collection of devices so that they function as desired within a system, an application program 110 accesses and controls the devices 160 by communicating with the appropriate device drivers 150. A drawback of this approach is that since the control requests are sent directly to the individual devices by the application program, the control requests have to be device specific. This hinders the application program from being device independent, as the application program must have the capability to communicate which each of the various devices it wishes to control. For example, for Application A to communicate with devices A, B and C, Application A must format three separate messages according to the requirements of the three different device drivers. As such, Application A must send three separate messages to each of the drivers as shown by lines 120.

In some systems, each kind of device performs a unique function that may also be related to the function of one or more other devices. For example, a state change of one device may trigger an action on one or more other devices. This may result in one driver communicating with one or more other drivers, as shown by inter-driver communication 130. Although direct communication between devices is fast, such direct communication prevents a system from being designed and maintained modularly as each device is required to have knowledge of other related devices. That is, each device driver must know how to communicate with each of the other device drivers.

When, for example, functionality enhancements require the replacement or upgrade of a device, the replacement will require not only the modification or replacement of the device's driver, but also modification of control applications and/or other device drivers that rely on software features and control points of the device. That is, when a device is replaced or upgraded, each of the other devices and application programs that access the device must also be updated so as to be able to communicate with the replaced or upgraded device.

In many embedded computer systems, before executing a user-level request on a device, the application program is required to know the state of all related devices. This results in costly overhead in an embedded system, as each communication to a desired device may require multiple preliminary status requests of other related devices. In addition, when building a redundant device model, each device via its driver may be required to have intricate knowledge of related devices. As already discussed, this increases overhead due to the inter-device communication required. Moreover, hardware and software upgrades are difficult as they cause the re-writing of the device drivers of related devices.

In some systems, a request from an application program to device A may cause device A to generate another request to device B, which in turn may generate a further request to device C. If one of the nested requests fail, the operation needs to be rolled back and restarted. This requires drivers to keep complicated information about the states of other devices. Handling failures in this type of nested request introduces great complexity in the drivers resulting from the dependency among devices.

In some systems, concurrent requests from multiple controlling application programs cannot be easily serialized and may lead to inconsistent states. For example, if Application A sends device-specific requests R1, R2, R3 and R4, and Application B sends device-specific requests S1 and S2, because of the scheduling mechanisms of the operating system, the requests may be received by the devices in an interleaved fashion such as, R1, S1, R2, S2, R3, R4. This may cause unintended results and may waste resources by causing errors that result in a roll back and retry.

When inter-device communication is needed in embedded systems, one drawback of allowing inter-device communication is that if one application's request to a driver is blocked due to the driver waiting for an I/O operation, a second request to the same device from another application may fail or block. In this circumstance, software may be added to each and every driver to return a "busy" indication to the second application. However, adding this software to each driver is burdensome and costly.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIGS. 5A and 5B illustrate a flow of actions taken pursuant to one embodiment of the invention.

DETAILED DESCRIPTION OF THE INVENTION

The system and method described herein are used to access and control related devices of different kinds in an embedded computer using a software interface referred to as a multiplexor (MUX) driver. The MUX driver allows for a uniform means of communication between one or more managing and/or controlling application programs and devices and among the devices themselves. The MUX driver presents a simpler view of the devices to application programs while providing a non-intrusive, transparent upgrade or replacement path for the individual devices and their driver software. Having a known interface for inter-device communication allows for easy replacement of devices and their drivers as no resulting reworking of other drivers is required.

Figure 1:
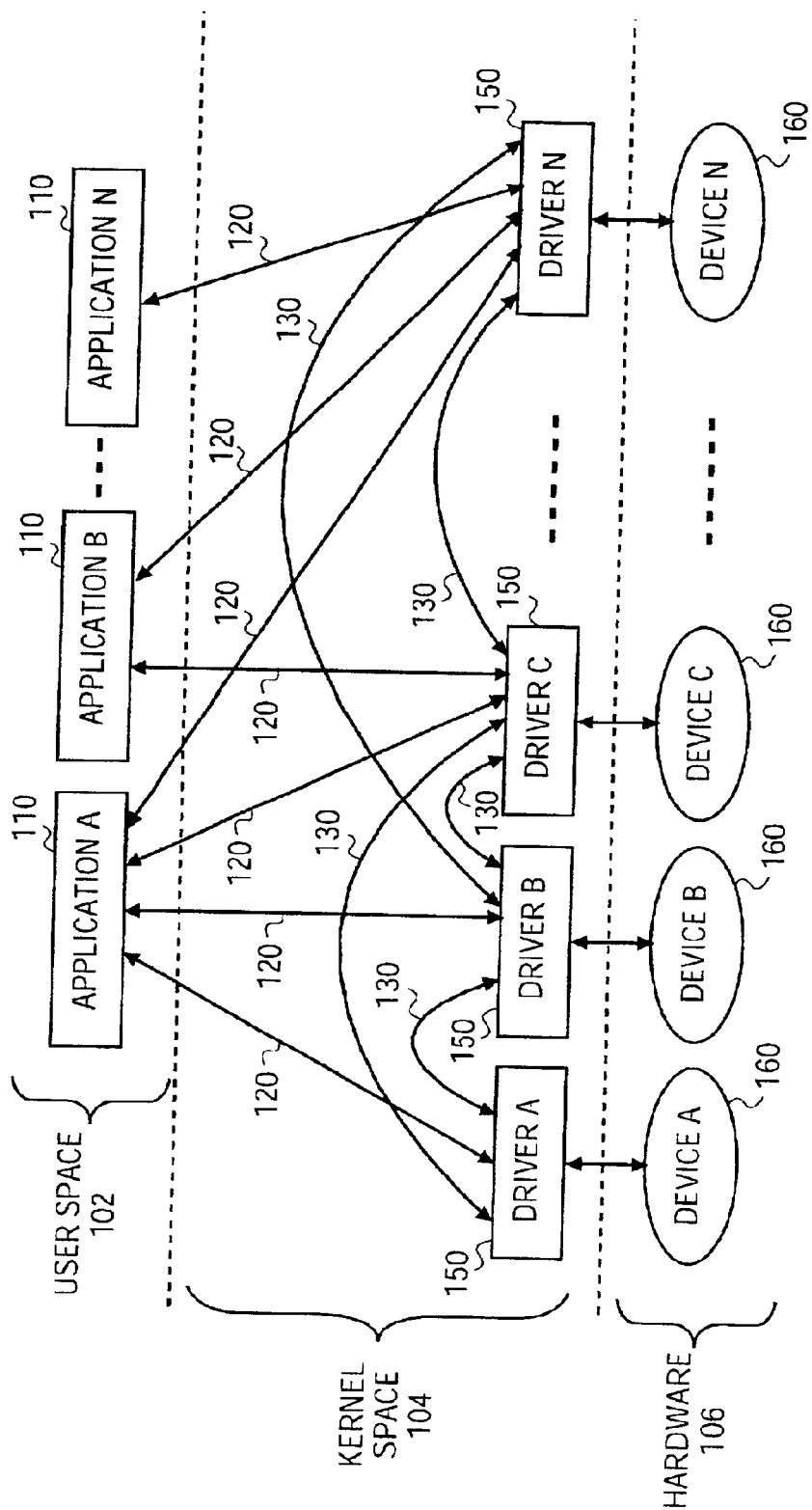
FIG. 1 (Prior Art) illustrates a generalized conceptual architecture of prior art communication between application programs and device in a computer system.
Figure 2:
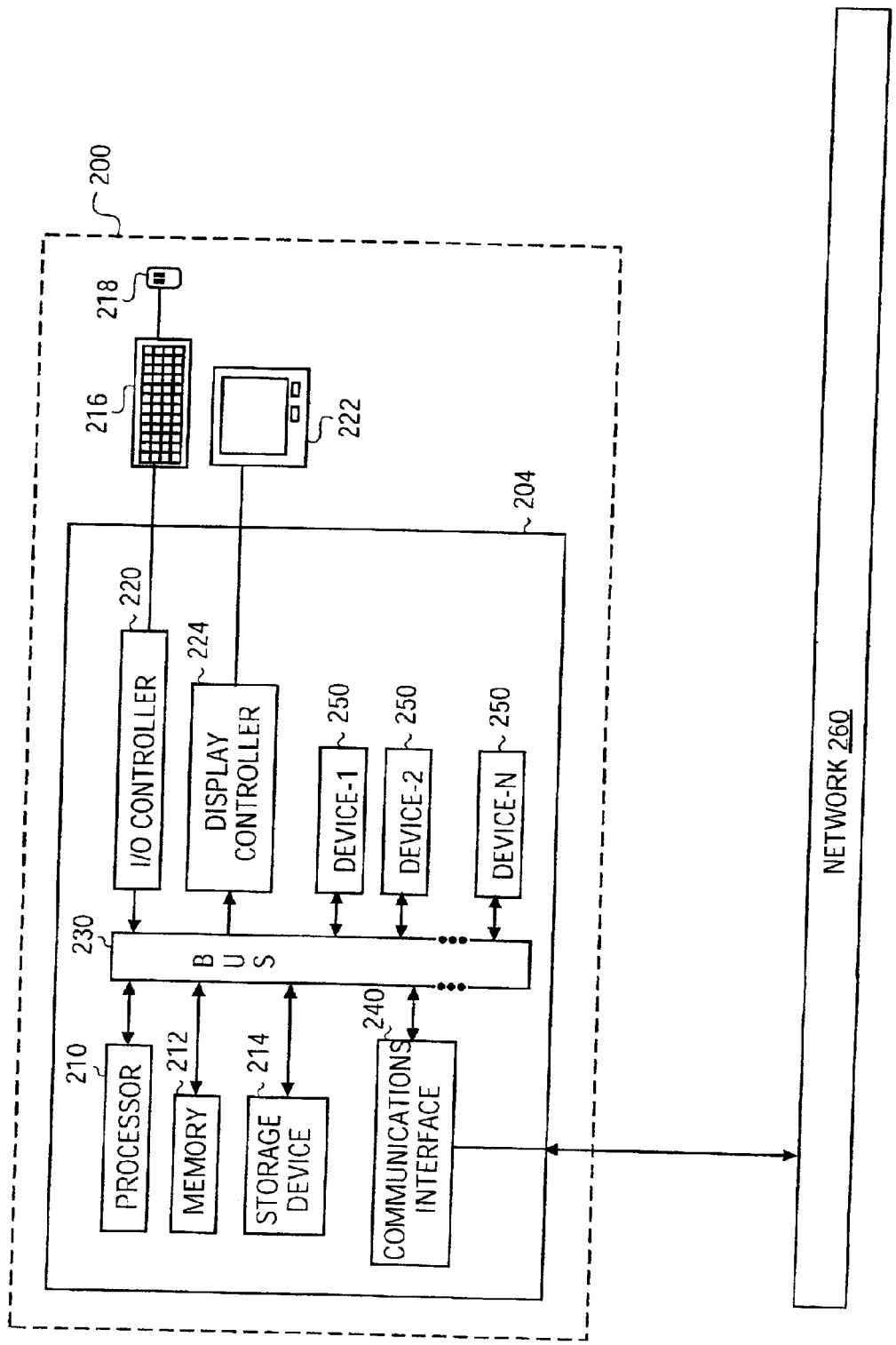
FIG. 2 illustrates a hardware environment in which one embodiment of the invention may execute.

FIG. 2 illustrates a hardware environment in which one embodiment of the invention may execute. System 200 may be an embedded computer system that includes a computing device 204, display monitor 222, and input devices such as a keyboard 216 and mouse 218. The display monitor and input devices are optional and are only needed if user interaction is required by application programs running on the computing device. The computing device 204 is coupled to a network 260 via communications interface 240. In one embodiment, network 260 is capable of communication using the User Datagram Protocol (UDP) and the Internet Protocol (IP). (For more information on UDP and IP, see J. Postel, *User Datagram Protocol*, RFC 768, Aug. 28, 1980, http://www.rfc-editor.org/rfc/rfc768.txt and J. Postel, *Internet Protocol*, RFC 791, September 1981, http://www.rfc-editor.org/rfc/rfc791.txt., incorporated herein by reference.) In other embodiments, the Transmission Control Protocol (TCP) or Stream Control Transmission Protocol (SCTP) may be used in place of or in addition to UDP. (For more information on TCP and SCTP see T. Socolofsky, *A TCP/IP Tutorial*, RFC 1180, January 1991, http://www.rfc-editor.org/rfc/rfc1180.txt and R. Stewart et al., *Stream Control Transmission Protocol*, October 2000, http://www.rfc-editor.org/rfc/rfc2960. txt., incorporated herein by reference.)

Computing device 204 may include a processor 210, memory 212, storage device 214, input/output (I/O) controller 220, display controller 224, and one or more devices 250. In one embodiment, devices 250 may include networking devices such as digital subscriber line (DSL) hardware, a Digital Signal Processor (DSP) device, a plain old telephone system (POTS) device, etc. The number of devices and kinds of devices are not limited. Some other devices include synchronous optical network (SONET) hardware, E1 hardware, T3 hardware, T1 hardware, asynchronous transfer mode (ATM) hardware, very high speed DSL (VDSL) hardware, Gigabit Ethernet hardware, fiber optic hardware, satellite transmission hardware, microwave communication hardware, infrared communication hardware, etc. In one embodiment, computing device 104 may include multiple processors.

In one embodiment, some or all of the methods which individually and/or collectively make up the invention described herein may be stored as software (i.e., computer readable instructions) on storage device 214 and executed by processor 210 using memory 212. In another embodiment, the method may be stored as hardware or a combination of hardware and software such as firmware. In one embodiment, storage device 214 may be any machine readable medium, where a machine readable medium includes any mechanism that provides (i.e., stores and/or transmits) information in a form readable by a machine (e.g., a computer). For example, a machine readable medium includes read only memory (ROM); random access memory (RAM); magnetic disk storage media such as a hard disk drive or floppy disk drive; optical storage media such as a compact disk read-only memory (CD-ROM) and a readable and writeable compact disk (CD-RW); flash memory devices including stick and card memory devices; coupled to bus 230 via electrical, optical, acoustical or other form of propagated signals (e.g., carrier waves, infrared signals, digital signals, etc.); etc. The various components of computing device 204 may be coupled to one another via bus 230. Bus 230 may be any well-known or proprietary bus. In addition, one or more buses may be included in various embodiments (e.g., processor, memory and/or peripheral busses).

In one embodiment, computing device 204 may be a card connected to a back plane and each of devices 250 maybe separate cards connected to the same back plane. In this embodiment, system 200 may be a rack system or a card cage. In another embodiment, system 200 may include a server computer as computing device 204, and devices 250 may be coupled internally and/or externally with computing device 204. In one embodiment, system 200 may include a well known operating system such as, in one embodiment, Linux.

Figure 3:
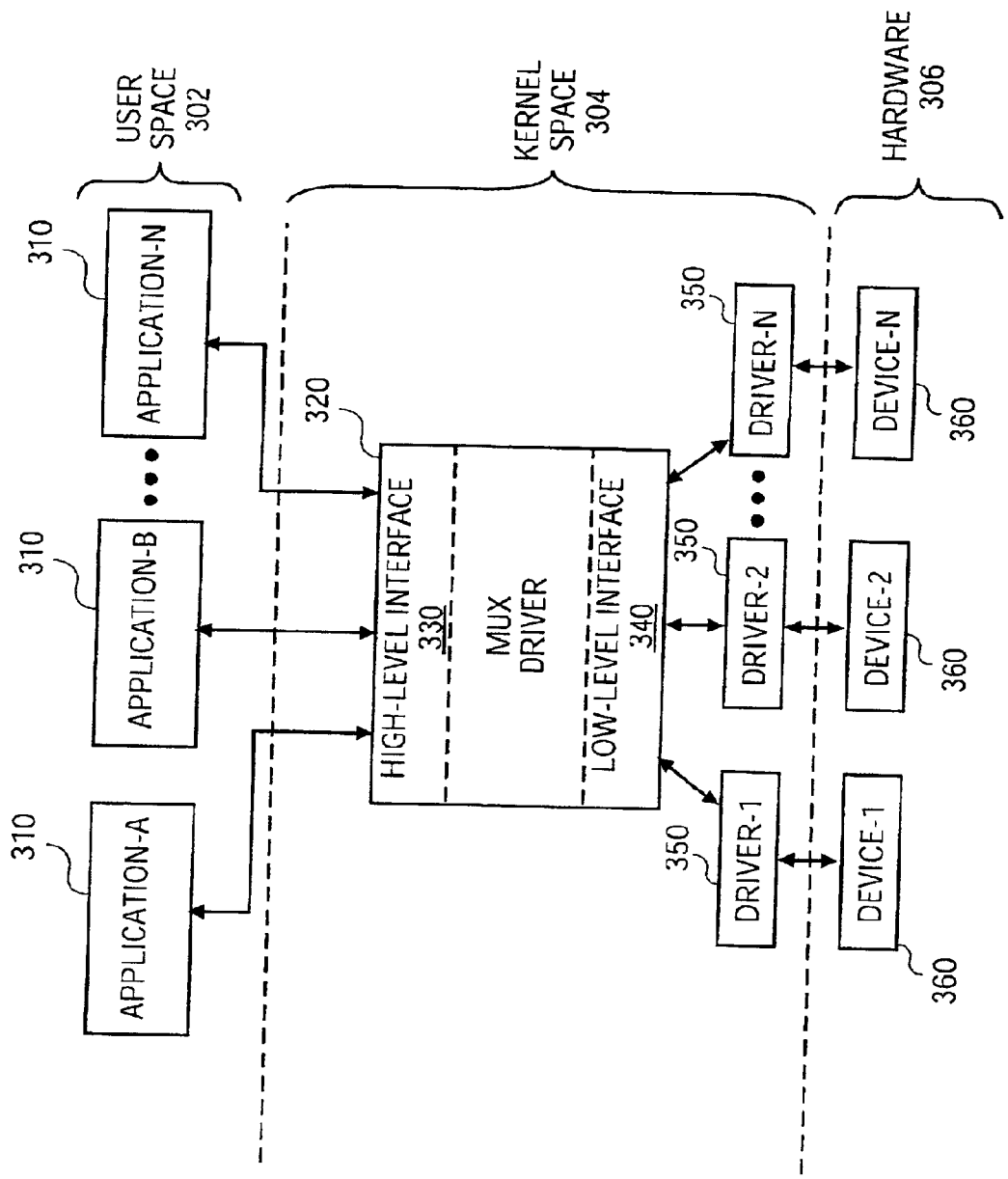
FIG. 3 illustrates a generalized conceptual architecture of one embodiment of the invention.

FIG. 3 illustrates a generalized conceptual architecture of one embodiment of the invention. In one embodiment, the methods of the invention may be thought of as residing in the kernel space 304, where the kernel space 304 resides between the user space 302 and hardware 306. In another embodiment, the methods of the invention may reside as software executed in user space 302. The kernel refers to the software of an operating system in the UNIX® family of operating systems and its variants, such as Linux. In one embodiment, the kernel is that of the Linux operating system. The system and method described herein are not limited to UNIX® derived operating systems, and may be used with any operating system whether the operating system includes conceptual architecture akin to a kernel space and a user space or not.

In one embodiment, one or more application programs such as applications 310 exist in user space 302. In one embodiment, the application programs 310 may exist on one computing device, computer or system. In another embodiment, application programs may exist on multiple computing devices, computers or systems. The application programs communicate with devices 360 via high-level MUX driver interface 330 of MUX driver 320 that exists in kernel space 304. In one embodiment, the communication method used between application programs 310 and MUX driver 320 may, in LINUX, be via /proc files, ioctl's or in other embodiments and/or other operating systems, other system calls or direct function calls. In other embodiments (not shown) where there is no kernel/user space separation, communication between application programs and the MUX driver may be via direct function call. In one embodiment, MUX driver 320 may be moved to and exist in user space 302; in such an embodiment, drivers 350 remain in kernel space 304 and devices 360 remain as hardware 306. The MUX driver 320 passes information between devices 360 and application programs 310. For example, the application programs may send device control requests and status requests to MUX driver 320. In one embodiment, for each device or group of same devices, there is a driver 350 associated with the device or group of devices. In addition, each of the device drivers 350 may communicate with one another via a low-level MUX driver interface 340 provided by MUX driver 320. In one embodiment, low-level MUX driver interface 340 and high-level MUX driver interface 330 may be the same interface.

In one embodiment, the application programs may provide a user access from the user space 302 to the devices 360 at hardware level 306. MUX driver 320 allows application programs 310 from user space 302 to access devices 360 at hardware level 306 in a uniform manner by providing a high-level MUX driver interface 330. In this way, the application programs are not required to conform to the unique communication requirements of each of the drivers 350. This makes communication and monitoring of devices by application programs easier to implement and achieve. The application programs send a high-level message to the MUX driver, which then converts the high-level message into low-level requests that are sent to one or more devices.

In various embodiments, the application programs 310 may send control requests to one or more devices via MUX driver 320 as high-level messages. These control requests may be used for various purposes, such as, for example, to set or change one or more options or features of a designated device, to power up a designated device, to power down a designated device, to restart a designated device, to upgrade software on a designated device, such as a programmable read only memory (PROM) upgrade or firmware upgrade, etc. In various embodiments, the application programs 310 may send status requests to one or more local devices via MUX driver 320. These status requests may be used by some application programs 310 to monitor the status of the device(s) and determine whether to automatically send a communication to or otherwise notify a system administrator, to automatically take load balancing actions, to automatically reconfigure one or more devices, to automatically restart or shut down one or more devices, etc. Other application programs 310 may be user driven and respond to system operator requests for status information. Based on the status information received, the user may then issue commands via an application program that communicates control requests to the devices via the MUX driver to balance the load on particular devices, to reconfigure one or more devices, to restart or shut down one or more devices, etc.

According to this architecture, the writing of application programs is simplified because each of application programs 310 only need be able to communicate via the high-level interface to MUX driver 320. This removes the need for the application programs to know how to communicate with each of disparate device drivers 350. Only MUX driver 320 needs to know how to communicate with each of drivers 350.

Similarly, when a device receives a request, it may need to learn the status of other devices. The devices may communicate with each other in a uniform manner via low-level interface 340 by sending messages to MUX driver 320 in a low-level format prescribed by the MUX driver. In this way, the devices need only be able to communicate with the MUX driver rather than each of the disparate devices and their device drivers. This simplifies writing of device drivers and eases the path of upgrades and integrating updated and new devices.

In addition, when a device changes its state, be it in response to a control request from an application program, sensing network conditions, detecting changes in physical connection status or any other occurrence, the device may send a state change notice to other related devices. Rather than communicating directly with each of the other devices in a system, according to the methods described herein, the device need only send a single, low-level message to the MUX driver indicating the state change. The MUX driver has the necessary intelligence to notify the appropriate devices, and may also notify any interested application programs, of the change in state of the device.

Figure 4:
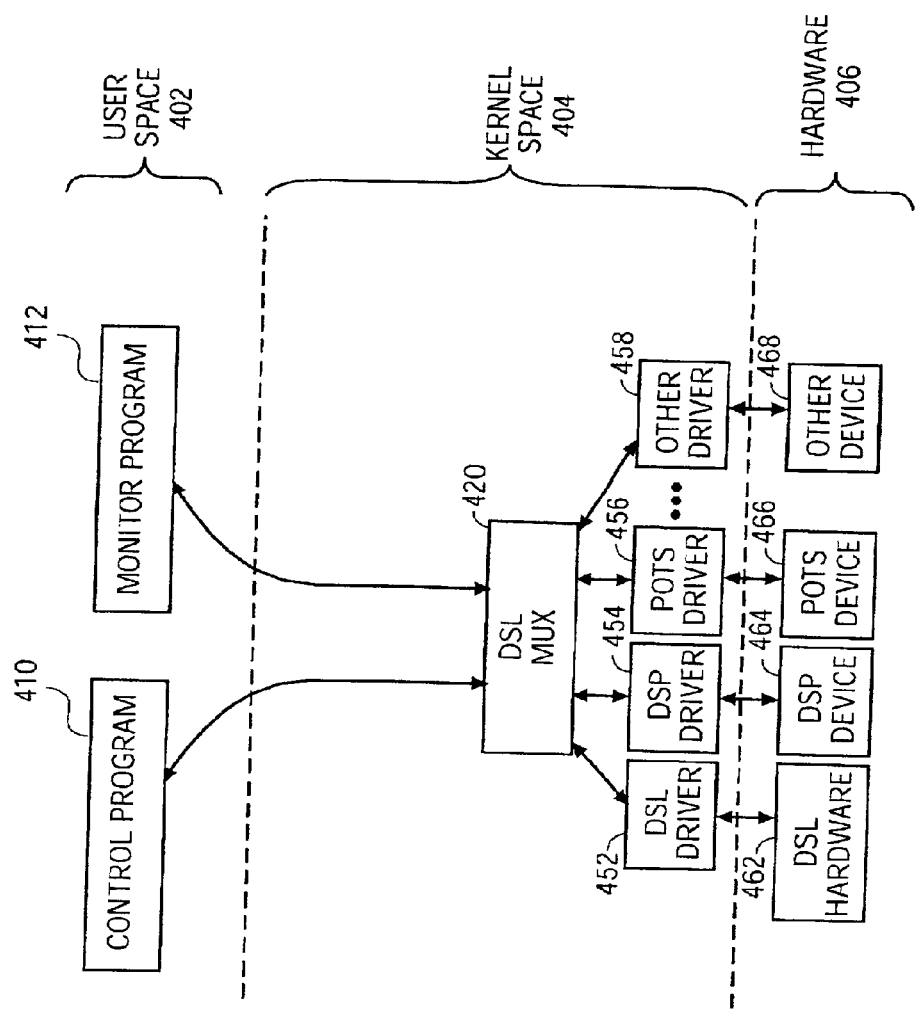
FIG. 4 illustrates a conceptual architecture of one embodiment of the invention.

FIG. 4 illustrates a conceptual architecture of one embodiment of the invention. In various embodiments, application programs may be used to control a particular device or a particular class of devices local to the system on which the application program resides, and may be used to monitor a device or monitor a particular class of devices local to the system on which the application program resides. In one embodiment, control program 410 may be used to control digital subscriber line (DSL) hardware 462 such as a DSL modem. The DSL modem may support one or more varieties of DSL technology such as, for example, asymmetric DSL (ADSL), symmetric DSL (SDSL) and G.lite. A user may wish to send a control request via control program 410 to DSL hardware 462 to change settings on the DSL modem, to restart the DSL modem, etc. To do so, control program 410 must be written so as to be able to communicate with DSL MUX driver 420. In this embodiment, the application programs, such as control program 410 and monitor program 412, communicate with hardware devices such as DSL hardware 462 via DSL MUX driver 420. In one embodiment, DSL MUX 420 may receive control and/or monitor program requests from application programs in the form of a high-level message specifying a group of devices or all devices. In this embodiment, DSL MUX 420 then issues appropriate commands or messages to each of the devices via the appropriate device drivers. In one embodiment, for example, DSL driver 452 is used to control and communicate with DSL hardware 462, Digital Signal Processor (DSP) driver 454 is used to communicate with DSP device 464, plain old telephone system (POTS) driver 456 is used to communicate with POTS device 466, etc. The number of devices and kinds of devices are not limited. Some other devices include synchronous optical network (SONET) hardware, E1 hardware, T3 hardware, T1 hardware, asynchronous transfer mode (ATM) hardware, very high speed DSL (VDSL) hardware, Gigabit Ethernet hardware, and the like. Further devices may include, for example, other fiber optic hardware, satellite transmission hardware, microwave communication hardware, infrared communication hardware, etc.

In one embodiment, the DSL MUX communicates with the drivers via function calls and the application programs communicate with the DSL MUX via any of a variety of well-known techniques. These techniques include via netlink sockets, ioctls, function calls, /proc file system, etc. In these embodiments, not only can information be passed from application programs through the DSL MUX to devices, but information can be passed from the devices through the DSL MUX to the appropriate application program. In this embodiment, the DSL MUX serves as a multiplexor for information passing to multiple DSL devices from a single control application program and as a demultiplexor for information passing from multiple DSL and/or other devices to control and/or monitor application programs. In this embodiment, the control application program may be a specialized DSL control application program, and the monitor application program may be a specialized DSL monitor application program.

In one embodiment, the MUX driver may regularly gather a plurality of statistics regarding the plurality of devices. In one embodiment, this may be achieved by monitoring the contents of existing messages sent by the devices responsive to requests from application programs. In another embodiment, this may be achieved by the MUX driver explicitly sending regular and periodic status requests to those devices coupled with the MUX driver. In one embodiment, the MUX driver may periodically forward a message reporting the plurality of statistics regarding the plurality of devices to those application programs that subscribed to such a message and/or to those application programs that the MUX driver had determined should receive the statistics messages based on a prior control request sent regarding the device.

In another embodiment, the MUX driver may, using the statistics mentioned in the prior paragraph, determine which of the devices issued errors that exceed a threshold number of errors. In this way the determination is based on the statistics. If the MUX driver determines that the error threshold has been exceeded for a device, the MUX driver may, in various embodiments, send a shut-down message to the device and/or send a message to a monitor and/or a control application program.

In one embodiment, the MUX driver may maintain a database of configuration information regarding devices retrieved from the devices, particularly those devices that are primary devices. Primary devices are those devices of which there are other similar or same devices, such that the secondary devices may be used as back up devices for the primary devices. By maintaining configuration information for the primary devices, when the primary devices fail or are shut down for some reason, a secondary device may be configured to match the configuration of the down primary device. That is, the configuration information for the primary device is applied to a secondary device when the primary device is taken off-line.

Figure 5A:
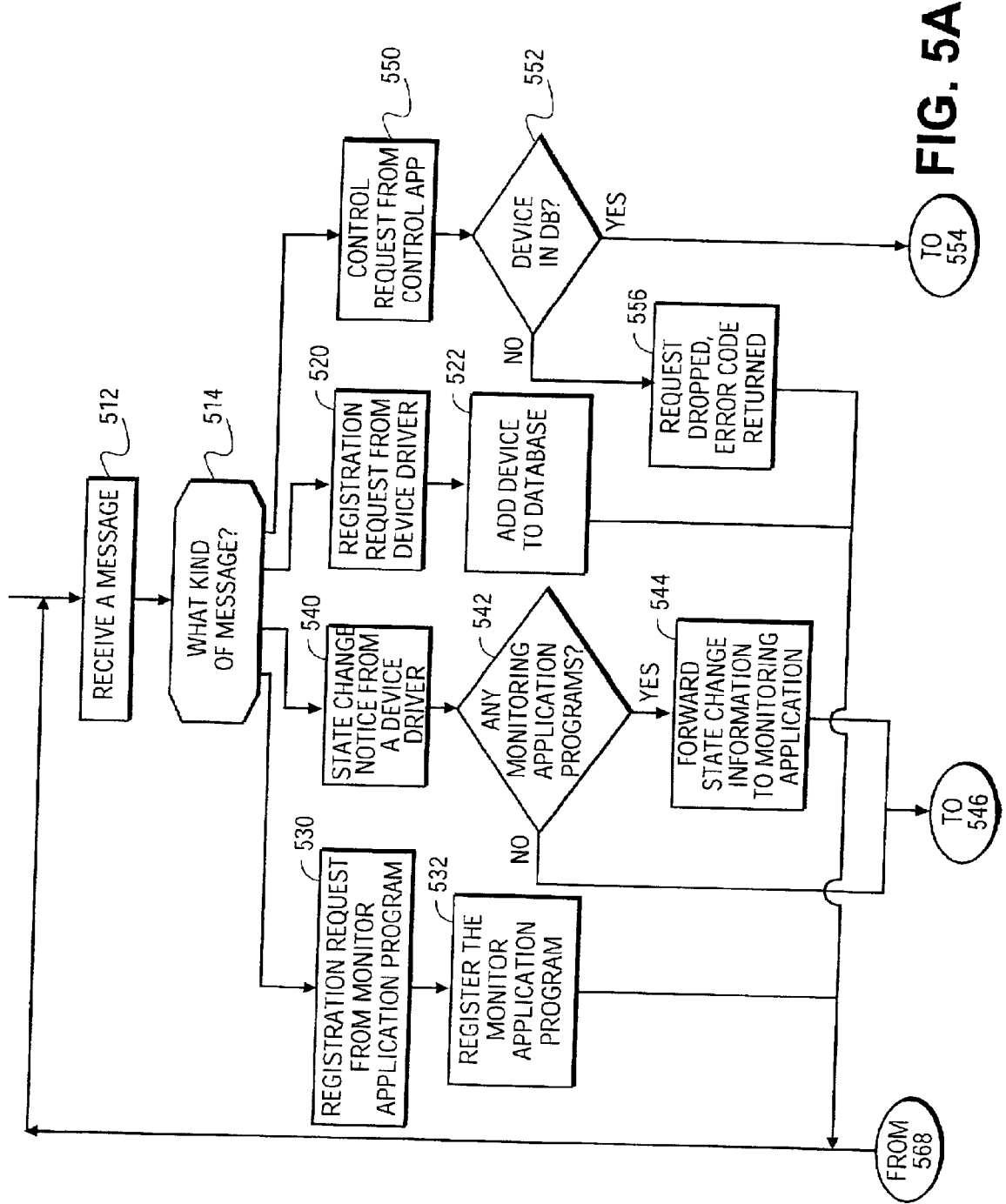

FIGS. 5A and 5B illustrate a flow of actions taken pursuant to one embodiment of the invention. The MUX driver receives a message, as shown in block 512. In one embodiment, the message may contain various fields that are in attribute, value, length format. In one embodiment, the message may be either a high-level message or a low level message. In one embodiment, a message may contain a message type and any data relevant to that message type. The content of the message, and, more specifically, the message type determines what occurs next. In one embodiment, messages are received and then processed sequentially in the order in which they are received. The message is analyzed, and the kind of message is extracted, as shown in block 514.

If the message is a registration request from a device driver, then the MUX driver registers the device by adding a device driver identifier to a database maintained by the MUX driver, as shown in block 522. In one embodiment, a function call identifier may be included in the registration request such that the function call identifier is also added to the database to be used for future communication with the driver. The flow of actions then continues at block 512.

If the message is a registration request from a monitor application program, as shown in block 530, then the MUX driver registers the monitor application program, as shown in block 532. In this way, a monitor application program may subscribe to events from a specified device, device class, or group of devices to receive messages when events at the specified device occurs. The flow of actions then continues at block 512.

If the message is a state change notice from a device received via a device driver, as shown in block 540, a check is then made to determine whether any monitoring application programs have registered to receive events from the device, as shown in block 542. In one embodiment, this is achieved by reviewing the database. If one or more application programs monitor the device, then state change information is forwarded to those application programs that monitor the device, as shown in block 544. In one embodiment, application programs that monitor the device include monitor application programs that explicitly subscribe to events regarding specified device or devices, and, in one embodiment, may also include control application programs that sent control requests regarding a particular device or class of devices. In this way, the control application programs do not register with the MUX driver or subscribe to events, and the MUX driver transparently retains information about devices and control applications that sent control requests regarding a particular device or devices. If there are no application programs monitoring the device as determined in block 542, and after the state change information has been forwarded to any monitoring application programs in block 544, the state change notice is converted into one or more low-level requests to be directed to drivers for other devices, as shown in block 546.

If the message is a control request from a control application program specifying one or more devices or kinds of devices, as shown in block 550, a check is made to determine whether the device is registered with the MUX driver by checking the database, as shown in block 552. In one embodiment, the control request may be a status request for information concerning a particular device, a particular class of devices, or all devices. In another embodiment, the control request may be a command to one or more of the devices to change or otherwise update one or more specified settings, to restart, to shut down, etc. If the specified device or devices are accessible via the MUX driver, the control request is converted into one or more low-level requests to be sent to the specified device(s), as shown in block 554. In one embodiment, this communication is achieved via the function stored in the database indexed by the device identifier. If the device specified in the control request is not registered with the MUX driver, that is, it is not in the database, then the request is dropped and an error message is returned to the requesting control application program, as shown in block 556.

After the state change notice and the control request are converted into one or more low-level requests, as shown in blocks 546 and 554, the low-level requests are sent to one or more drivers, as shown in block 560. This can either be done in a sequential manner with a particular order or it can be done in parallel depending on the nature of the high-level request. If when done in a sequential manner any request in the sequence fails, the rest of the requests in the sequence are not executed. Responses to the low-level requests are then collected, as shown in block 562. The MUX driver then determines whether each of the particular low-level requests was successful by examining the collected results, as shown in block 564. If the low-level request was unsuccessful, then any previous low-level requests associated with the unsuccessful low-level request or otherwise related to the unsuccessful low-level request are rolled back, as shown in block 566. An example of an unsuccessful low-level request may be a control request that attempts to modify a setting or configuration which the particular device will not allow to be modified, such that the device rejects the corresponding resulting low-level request.

After determining that the low-level requests were successful in block 564 and after the roll back necessitated by one or more unsuccessful low-level requests in block 566, an appropriate result code is sent to the initiating control application program or driver, as shown in block 568. Flow then continues at block 512.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:

receiving from multiple application programs executing within one or more computer environments, instructions intended for one or more target computer-based devices, said instructions being issued by the application programs in high-level, non-target device specific formats interpretable by a software communication portal receiving said instructions;

translating, at the software communication portal, said instructions from the high-level, non-target device specific formats to target device specific formats appropriate for software drivers associated with respective ones of the target computer-based devices for which said instructions were intended and according to target computer-based device information specified in the instructions; and communicating the instructions as formatted in the target device specific formats from the software communication portal to each of the software drivers as appropriate according to the target computer-based device information specified in the instructions.

2. The method of claim 1 further comprising:

receiving at least one low-level message from at least one of the target computer-based devices;

translating the at least one low-level message to at least one high-level message; and forwarding the at least one high-level message to the at least one application program that sent the at least one of the instructions in high-level, non-target device specific formats.

3. The method of claim 1 wherein the at least one of the instructions comprises at least one of a status request and a control request.

4. The method of claim 1 wherein receiving the instructions is achieved via one of/proc file system, ioctl, system call and direct function call.

5. The method of claim 1 further comprising:

regularly gathering a plurality of statistics regarding the one or more target computer-based devices.

6. The method of claim 5 further comprising:

periodically forwarding a high-level message reporting the plurality of statistics regarding the one or more target computer-based devices to the at least one application program.

7. The method of claim 5 further comprising:

determining which of the one or more target computer-based devices issued errors that exceed a threshold number of errors based on evaluation of the plurality of statistics; and sending shut-down messages to each of the one or more target computer-based devices that issued errors that exceed a threshold number of errors.

8. The method of claim 5 further comprising:

retrieving a plurality of configuration information from a primary device of the one or more target computer-based devices; and applying the configuration information to a secondary device when the primary device is taken off-line.

9. A tangible machine readable medium having stored thereon instructions which when executed by a processor cause a machine to perform operations comprising:

receiving from multiple application programs executing within one or more computer environments, instructions intended for one or more target computer-based devices, said instructions being issued by the application programs in high-level, non-target device specific formats interpretable by a software communication portal receiving said instructions;

translating, at the software communication portal, said instructions from the high-level, non-target device specific formats to target device specific formats appropriate for software drivers associated with respective ones of the target computer-based devices for which said instructions were intended and according to target computer-based device information specified in the instructions; and communicating the instructions as formatted in the target device specific formats from the software communication portal to each of the software drivers as appropriate according to the target computer-based device information specified in the instructions.

10. The tangible machine readable medium of claim 9, wherein the instructions cause the machine to perform operations further comprising:

receiving at least one low-level message from at least one of the target computer-based devices;

translating the at least one low-level message to at least one high-level message; and forwarding the at least one high-level message to the at least one application program that sent the at least one of the instructions in high-level, non-target device specific formats.

11. The tangible machine readable medium of claim 9 wherein the at least one of the instructions comprises at least one of a status request and a control request.

12. The tangible machine readable medium of claim 9, wherein the instructions caused the machine to perform operations further comprising:

regularly gathering a plurality of statistics regarding the one or more target computer-based devices.

13. The tangible machine readable medium of claim 12, wherein the instructions cause the machine to perform operations further comprising:

periodically forwarding a high-level message reporting the plurality of statistics regarding the one or more target computer-based devices to the at least one application program.

14. The tangible machine readable medium of claim 12, wherein the instructions cause the machine to perform operations further comprising:

determining which of the one or more target computer-based devices issued errors that exceed a threshold number of errors based on evaluation of the plurality of statistics; and sending shut-down messages to each of the one or more target computer-based devices that issued errors that exceed a threshold number of errors.

15. The tangible machine readable medium of claim 12, wherein the instructions cause the machine to perform operations further comprising:

retrieving a plurality of configuration information from a primary device of the one or more target computer-based devices; and applying the configuration information to a secondary device when the primary device is taken off-line.

16. A method comprising:

receiving from multiple application programs executing within one or more computer environments, instructions intended for one or more class of target computer-based devices, said instructions being issued by the application programs in high-level, non-target device specific formats interpretable by a software communication portal receiving said instructions;

translating, at the software communication portal, said instructions from the high-level, non-target device specific formats to target device specific formats appropriate for software drivers associated with respective ones of the class of target computer-based devices for which said instructions were intended and according to the target computer-based device information specified in the instructions; and communicating the instructions as formatted in target device specific formats from the software communication portal to each of the software drivers as appropriate according to the target computer-based device information specified in the instructions.

17. The method of claim 16 further comprising:

receiving at least one low-level message from at least one of the target computer-based devices;

preparing at least one instructions in the target device specific format to other target computer-based devices responsive to the at least one low-level message;

receiving a group of low-level messages from at least one of the target computer-based devices that received the instructions in the target device specific format;

processing the group of low-level messages to create a single high-level message; and forwarding the single high-level message to the application program.

18. The method of claim 16 wherein the class of devices comprise a group of digital subscriber line (DSL) devices.

19. The method of claim 18 wherein the group of DSL devices comprise at least two of a DSL modem, a Digital Signal Processor (DSP) device, a plain old telephone system (POTS) device, a synchronous optical network (SONET) hardware, an E1 device, a T3 device, T1 hardware, an asynchronous transfer mode (ATM) device, a very high speed DSL (VDSL) device, and a Gigabit Ethernet device.

20. A method comprising:

providing a multiplexor, including
a high-level interface to receive from multiple application programs executing within one or more computer environments, instructions intended for one or more target computer-based devices, said instructions being issued by the application programs in high-level, non-target device specific formats, and
a low-level interface to receive a plurality of low-level messages from software drives associated with one or more target computer-based devices;

the multiplexor configured to
translate said instructions from the high level, non-target device specific formats to a first group of instructions in target device specific formats appropriate for the software drivers associated with respective ones of the target computer-based devices for which said instructions were intended and according to target computer-based device information specified in the instructions;
communicate the instructions as formatted in the target device specific formats to each of the device drivers as appropriate according to the target computer-based device information specified in the instructions;
translate the low-level messages to at least one high-level message; and
forward the high-level message to at least one application program.

21. The method of claim 20 wherein the multiplexor is further configured to:

translate the low-level messages to a second group of instructions in target device specific formats.

22. The method of claim 20 wherein the devices are a plurality of digital subscriber line (DSL) devices.

* * * * *